United States Patent Office 3,499,811
Patented Mar. 10, 1970

3,499,811
PRODUCTION OF MICROPOROUS FLEXIBLE
MATERIALS
Dennis I. Clarke, Erdington, Birmingham, England, assignor to Dunlop Rubber Company Limited, London, England, a British company
No Drawing. Filed July 12, 1965, Ser. No. 471,390
Claims priority, application Great Britain, July 22, 1964, 29,612/64
Int. Cl. B32b 5/00; C08c 17/08
U.S. Cl. 156—176
20 Claims

ABSTRACT OF THE DISCLOSURE

Microporous flexible sheet material permeable to water vapor but not to liquid water is prepared by admixing an aqueous emulsion of a silicone oil with a vulcanizable rubber latex composition, heating this mixture sufficiently to cause gelation with water in the disperse phase, further heating the resulting gel at the vulcanization temperature for a sufficient time to effect vulcanization in the presence of water to prevent substantial evaporation of the water content of the gel, and then heating the vulcanized gel product under drying conditions to remove the water from the gel thereby forming micropores.

---

This invention relates to a method for the production of flexible materials that are permeable to water-vapour.

According to the present invention a method for the production of a flexible material comprises forming a mixture of an emulsion of a silicone oil with a rubber latex and one or more vulcanizing agents for the rubber, gelling the mixture so obtained, and heating the gelled mixture to effect vulcanization of the rubber under conditions such that escape of water from the gelled mixture is substantially prevented.

The method of the present invention enables a flexible material to be obtained which is permeable to water-vapour but not to liquid water providing that the gelled mixture is vulcanized in the wet state under conditions such that the escape of water from the gelled mixture is substantially prevented. The mixture is gelled usually under water or in an atmosphere of steam to prevent undue evaporation of water from the mixture. The material obtained by the method of the invention is microporous and can be used in a wide variety of applications. For instance, the latex mixed with the emulsion of the silicone oil can be used to impregnate fibrous webs or reticulated foams to cause them to be impermeable to water itself but permeable to water-vapour. The latex mixture can be laminated with woven fabrics or spread on to woven fabrics to make proof fabric which can be used for rainwear which allows perspiration to escape. Alternatively the latex mixture can be gelled in the form of a film which can then be laminated with a suitable substrate, e.g. fabric, if desired. Paper or non-woven fabrics can be impregnated.

The silicone oils which are used can have a viscosity of from 10 centistokes to 1,000,000 centistokes such as those based on methyl silicones. A typical silicone oil is formed from dimethyl polysiloxane. Another silicone oil is phenyl methyl polysiloxane. The amount of silicone oil mixed with the rubber latex should be at least 0.6 percent by weight based on the weight of dry rubber in the latex.

The rubber latex can be a latex of natural or any synthetic rubber and can be, for example, a latex based on a copolymer of styrene and butadiene, polyisoprene, polyisobutylene, polybutadiene or a copolymer of ethylene and propylene with or without a third comonomer which confers unsaturation on the copolymer to enable it to be vulcanized by means of sulphur. Latices of graft polymers can be used, e.g. a latex of a graft polymer of natural rubber and methyl methacrylate. Mixtures of different synthetic rubber latices can also be used as can mixtures of a natural rubber latex with one or more synthetic rubber latex. The latex can be mixed with vulcanizing agents and accelerators and with gelling agents prior to mixing with the emulsion of the silicone oil. After mixing with the silicone oil the compounded latex can be used in a manner which is deemed desirable.

The compounded latex is particularly suitable for use in the manufacture of leather-like sheet material in which a consolidated mat of interpenetrated crimped continuous fibres is impregnated with the vulcanizable compounded latex. Alternatively, the consolidated mat can be formed from staple fibres either crimped or uncrimped. The compounded latex can be used to provide a surface coating for a consolidated mat of interpenetrated fibres. The types of material and method of forming the leather-like sheet material are more fully described in U.K. patent specification No. 989,433. The mat may be formed by various methods, for example by plying to give at least two separate layers of crimped continuous fibres which have been collected under tension or by collecting under tension, preferably substantially parallel crimped continuous fibres to the desired depth which, upon relaxation, provide a mat of crimped fibres. The mat may also be formed by drawing off a creel or beam an assembly of tensioned crimped continuous fibres of the desired depth which are then relaxed to provide a mat. When the mat is formed from separate layers of crimped continuous fibres, the general direction of the fibres in each layer may be generally parallel with, or at an angle to the general direction of the fibres in an adjacent layer or layers. After assembling the continuous fibres into the form of a mat they are usually needled by passing through a needling loom to cause interpenetration of the fibres to hold the various layers of the mat together. The consolidated mat so obtained is impregnated with the compounded latex produced according to the method of the present invention and the latex caused to gel. This can be done by heating the impregnated consolidated material by means of hot water or steam so that undue evaporation of water from the gelled latex does not occur. Further heating in the presence of hot water or steam effects vulcanization of the gelled latex and drying of the material after vulcanization is accomplished without stretching. Artificial leather-like material so produced is suitable for the manufacture of shoe-soles, upholstery for furniture and other leather goods, but is of particular use, for instance, as shoe uppers where the material is required to be permeable to water-vapour but not to water itself.

A consolidated mat of staple fibres can be a needled or un-needled mat produced by carding and cross-lapping or by air-laying.

The continuous fibres which are employed for the manufacture of leather-like sheet material are conveniently in the form of multi-filament yarns and they may be any which can be crimped and which have sufficient strength, elongation and resilience not to lose their crimp on relaxation after stretching under just sufficient tension to remove the crimp. Suitable fibres include man-made fibres such as nylon-type fibres, polyethylene terephthalate-type fibres, polyacrylonitrile-type fibres, polyolefine-type fibres, and rayon-type fibres, although natural continuous filament fibres such as silk may be employed. Generally, the fibres have a filament denier of between 0.5 and 20.

Non-woven fabrics or paper can be impregnated as already stated, and may be used as permeable soling materials for shoes. Extruded plastic fabrics such as nets may be impregnated, if desired.

The invention is illustrated in the following examples in which the following abbreviations are used for convenience:

NRL = Natural rubber latex having a 60 percent dry rubber content.
ASP = Aqueous solution of potassium oleate containing 15 grammes of potassium oleate per 100 grammes of solution.
AS = Aqueous dispersion of sulphur containing 50 grammes of sulphur per 100 grammes of dispersion.
ADN = Aqueous dispersion of di-beta-naphthyl-paraphenylenediamine containing 40 grammes of the solid per 100 grammes of dispersion.
ADZ = Aqueous dispersion of zinc diethyl dithiocarbamate containing 50 grammes of the material per 100 grammes of dispersion.
AZO = Aqueous dispersion of zinc oxide containing 50 grammes of the material per 100 grammes of dispersion.
ZM = Aqueous dispersion of zinc mercaptobenzthiazole containing 50 grammes of the material per 100 grammes of dispersion.
AAC = Aqueous ammoniacal ammonium chloride solution at pH 10.5 containing 20 grammes of the material per 100 grammes of solution.

EXAMPLE I

A composition was prepared from the following ingredients:

| | Grammes |
|---|---|
| NRL | 100.0 |
| ASP | 9.0 |
| AS | 6.0 |
| ADN | 1.5 |
| ADZ | 1.0 |
| Water | 40.0 |
| AZO | 3.0 |
| ZM | 3.0 |
| AAC | 13.0 |

A silicone-oil emulsion was prepared by stirring at a high speed 100 grammes of a silicone-oil having a viscosity of 1000 centistokes commercially available under the trade name "Midland Silicones MS 200 Silicone Fluid," into 50 grammes of an aqueous 15 percent solution of potassium oleate and 50 grammes of water. After stirring for 20 minutes, 5 grammes of the emulsion so obtained were stirred into the latex mixture prepared as above.

60 grammes of the mixture so obtained were placed in a square, flat tray having sides of 1 foot in length and the mixture spread over the surface of the tray. The tray was placed horizontally in a hot water-bath to effect gelation of the material, and boiling water was then poured on to the gelled material to prevent undue evaporation of water from the gelled material. After 5 minutes' standing under these conditions the gelled sheet of material was removed from the tray and placed in boiling water for 0.5 hour to effect vulcanization of the material.

After vulcanization, the sheet was removed from the water and placed in an air oven at a temperature of 100° C. until it was dry. The sheet was coloured white and was micro-porous. The sheet had a thickness of 0.37 mm. and a density of 0.73 gm./cc. and a water-vapour permeability of 2.3 mgm./cm.$^2$/hr.

The experiment described above was repeated, except that 5 grammes of water instead of the oil emulsion was added to the latex mixture. The sheet material obtained from this material had a density of 0.95 gm./cc., a thickness of 0.37 mm., and a water-vapour permeability of 0.01 mgm./cm.$^2$/hr. It is seen that the addition of the silicone oil emulsion considerably improves the permeability of the sheet to water-vapour.

The method for determining water-vapour permeability used in this and following examples is that described in British standard specification No. 3,177; 1959. The method is carried out at a temperature of 25° C. and a relative humidity of 75±2 percent.

EXAMPLE II

A web of crimped continuous 6-denier nylon 66 monofilament, laid under light tension in the form of parallel continuous yarns and subsequently relaxed and having a weight of approximately 20 gm./sq. ft. in the relaxed condition, was combined with a 5 gm./sq. ft. carded web of 3-denier polypropylene staple fibre and was passed through a needle punching machine to give 1600 punches per square inch. The needled web was compressed to a thickness of 1.5 mm. at 120° C. and then cooled at which thickness it remained.

A 1-foot square of this material weighing 25 grammes was laid, polypropylene-side downwards, on a flat-levelled tray. 250 grammes of the latex mixture containing the silicone oil, as described in Example I, were distributed over the surface of the material in the tray and padded to saturate the felt uniformly. A metal plate weighing 12 kilogrammes was placed on top of the saturated material in the tray to cause the excess latex mixtures to exude from the material and the tray was then placed in a steam oven for 20 minutes. At the end of this time the vulcanized wet sheet of material was removed from the tray and dried in an air oven at 100° C. for 15 minutes. Both surfaces of the impregnated sheet material were buffed lightly to remove the skin of excess rubber composition.

The product was extremely leather-like to the touch and in appearance, and had a density of 0.65 gm./cc. and permeability to water-vapour of 4.4 mgm./cm.$^2$/hr.

EXAMPLE III

A 1-foot square sheet of a micro-cellular polyurethane having a thickness of 0.5 mm. was prepared by compressing a reticulated polyether polyurethane foam of original density of 1.7 lb./cu. ft. by a factor of 22.1. This sheet of material having a weight of 25 grammes was impregnated with a latex mixture containing silicone-oil, as described in Example I, employing 20 grammes of the latex mixture and vulcanized under similar conditions. After a light buffing to remove the surface skin the sheet weighed 32 grammes.

The product was smooth to the touch and had a permeability to water-vapour of 5.2 mgm./cm.$^2$/hr.

EXAMPLE IV

A 1-foot square sample of the micro-cellular polyurethane, described in Example III, was placed in a levelled tray and a 1-foot square sheet of the needled web, described in Example II, was placed on top of this.

The laminate so obtained weighed 52 grammes and was impregnated with 250 grammes of the latex mixture containing silicone-oil as described in Example I, and heated in a similar manner to effect vulcanization of the latex mixture. The resultant sheet was buffed lightly to remove the surface skin and weighed 120 grammes and was 1.85 mm. thick. The material was very leather-like to the touch, being particularly similar to natural leather. The material had a permeability to water-vapour of 2.9 mgm./cm.$^2$/hr.

EXAMPLE V

A natural rubber latex composition was prepared from the following ingredients:

| | Parts by wt. |
|---|---|
| NRL | 167 |
| AS | 2 |
| ADZ | 1 |
| ADN | 2 |
| AZO | 6 |
| AAC | 8 |
| ASP | 6.7 |
| Water | 230 |
| Aqueous dispersion of pigment | 25 |

The aqueous dispersion of the pigment was a dispersion of a pigment commercially available under the name "Primal Dark Brown."

One square foot of the needled non-compressed web as described in Example II, weighing 25 grammes, was evenly impregnated with 330 grammes of the latex composition described above and placed in a stream oven for 5 minutes to gel the latex. The wet sheet was then dried in an air oven at 80° C. for 1 hour. The dry weight of the impregnated web was 100 grammes. The material was heated to 150° C. while compressed to a thickness of 1.5 mm. and held at this temperature for 5 minutes and cooled. 60 grammes of the latex composition containing the silicone-oil as described in Example I, were spread over the surface of a tray 1-foot square in size and the tray was placed in boiling water to effect gelation of the latex composition. After cooling the tray, a further 40 grammes of the latex composition were spread over the surface of the gelled material. A 1-foot square sample of the impregnated needled web was taken and the polypropylene surface of this wetted by brushing on to it a little of the latex composition containing the silicone-oil. The coated sheet was then placed in the tray and a metal plate, as described in Example II, placed on the upper surface of the consolidated material. Excess latex exuded at the edges of the material and the assembly was then placed in a stream oven for 20 minutes. The laminated product so obtained was removed from the tray and dried at 100° C. for 15 minutes.

The material obtained was a coated and impregnated felt having a density of 0.5 gm./cc. and a thickness of 2.22 mm. The material had a permeability to water-vapour of 1.08 mgm./cm.$^2$/hr.

EXAMPLE VI

A 1-foot square of compressed reticulated polyether polyurethane foam having a thickness of 0.5 mm. was laid on the surface of the tray and impregnated with 20 grammes of the latex composition containing silicone-oil as described in Example I. A 1-foot square sample of the impregnated and compressed needled web, as described in Example V, was placed with the polypropylene surface in contact with the foam in the tray after wetting the surface with a small amount of the latex composition. A metal plate was placed on the upper surface of the needled web and after heating in a steam oven for 20 minutes the resulting laminate was removed and dried at 100° C. for 15 minutes.

The product so obtained had a density of 0.7 gm./cc. and permeability to water-vapour of 1.6 mgm./cm.$^2$/hr.

EXAMPLE VIII

Emulsions of silicone oils in water were prepared using dimethyl polysiloxane oils obtainable under the name M.S. 200. Oils of viscosities 10; 350; 1000 and 12,500 centistrokes were employed, the method of emulsification being as follows:

100 parts of the silicone-oil were slowly poured into 50 parts of water and 50 parts of a 15 percent aqueous solution of potassium oleate, under high speed stirring using a standard laboratory emulsifier. After 20 mins. stirring, the emulsion was allowed to defoam for several hours.

A latex mixture was then prepared from the following ingredients:

| | Parts by weight |
|---|---|
| NRL | 100 |
| Water | 40 |
| ASP | 9 |
| AS | 6 |
| ADN | 1.5 |
| ZM | 3.0 |
| ADZ | 1.0 |
| AZO | 3.0 |

Films were prepared from each of the prepared silicone emulsions by the following method:

0.2 gramme of the particular silicone-oil emulsion were added with stirring to 10 grammes of the above latex mixture, together with 0.3 gramme of the aqueous ammoniacal ammonium chloride solution. A control mix containing 10 grammes of the latex mixture, together with an additional 0.05 gramme of the aqueous solution of potassium oleate, 0.05 gramme of water and 0.3 gramme of the aqueous ammoniacal ammonium chloride solution was also prepared.

The mixture was poured over a glass plate tray having sides 6" long, which was then placed horizontally in an atmosphere of steam, for 20 mins. to gel the latex and cure the film. The film was then removed from the plate, cooled, rinsed in water and dried in an air oven at 100° C. for 15 mins. The thickness of the film was approximately 0.010".

All the films prepared using the silicone oils were found to have retained their micro-porous gel-like structure after drying, while the control film had not. The porous nature of the films was obvious from their white appearance and their ability to absorb water applied to their surfaces upon stretching.

EXAMPLE VIII

A latex mixture was prepared from the formulation given in Example VII. To this were added, 3.3 parts of the silicone emulsion prepared in Example VII from the 1000 centistoke viscosity silicone-oil, 5.0 parts of an aqueous dispersion of brown pigment sold under the name Primal Dark Brown, and 4.8 parts of aqueous ammoniacal ammonium chloride solution.

This mixture was allowed to stand at room temperature for 45 mins. during which time a slight increase in viscosity occurred.

Open-mesh rayon fabric weighing 7 grammes per square foot and having a thickness of 0.07 inch was passed through a steam oven. The fabric was carried under tension through the oven by means of a tensioned endless belt. Prior to entering the oven the fabric was coated with the latex mixture from a spreading box and reduced to an even thickness of 0.020 by a doctor blade. The fabric was saturated with the mixture prior to doctoring. The spread sheet of latex mixture was then gelled in the steam oven and the belt then stopped and the gelled film cured by heating in the oven for 20 minutes. After curing the combined film and fabric was stripped off the belt and dried in an air oven at 100° C.

The resulting sheet consisted of a 0.010 inch thick film of micro-porous rubber attached to the reinforcing fabric. The sheet was an attractive pastel shade of brown and had a smooth pleasant feel. The water vapour transmission rate of the sheet was 95 percent that of the uncoated open-mesh fabric.

EXAMPLE IX 25 grammes of natural rubber latex of 60 percent dry rubber content, were blended with 75 grammes of a butadiene-styrene copolymer latex of 53 percent dry solids content obtainable under the name Intex 100. The copolymer contained 76 parts of butadiene and 24 parts of styrene.

To 100 parts of this blend of latices were added the following ingredients:

| | Parts by weight |
|---|---|
| ASP | 3 |
| Water | 40 |
| AS | 6 |
| ADN | 1.5 |
| ZM | 3.0 |
| ADZ | 1.0 |
| AZO | 3.0 |

7.0 parts of the emulsion made in Example VII from the silicone-oil of 1000 centistoke viscosity were then stirred in.

10 grammes of this latex mixture, together with 0.3 gramme of the aqueous ammoniacal ammonium chloride solution were spread uniformly over a 6" square glass plate. The plate and contents were placed on a levelled tray in a steam oven and gelled and cured for 45 mins.

The resultant coherent film was removed, rinsed and dried in a 100° C. air oven.

The dried film had all the characteristics of the porous films made in the previous examples that is, had a white appearance and absorbed water placed on the surface when stretched.

EXAMPLE X

A latex mix was prepared to the following recipe:

| | Parts by weight |
|---|---|
| NRL | 100 |
| ASP | 9 |
| Water | 40 |
| AS | 6 |
| ADN | 1.5 |
| ADZ | 1.0 |
| ZM | 3.0 |
| AZO | 3.0 |

To this were added 7.0 parts of the emulsion of MS 200 silicone-oil of 1000 centistoke viscosity made in Example VII, and 13.5 parts of a high styrene-butadiene copolymer latex of 50 percent dry solids content, obtainable under the name Politone K. 950. The copolymer contained 85 parts of styrene and 15 parts of butadiene.

0.3 gramme of aqueous ammoniacal ammonium chloride solution were stirred into 10 grammes of the mixture and spread over a 6" square glass plate. The plate and contents were placed in a levelled position in a steam oven and gelled and cured for 10 mins. After this time the 0.010" thick film was removed from the plate, rinsed and dried at 100° C.

The film was micro-porous since it has a white appearance and the ability to absorb water applied to its surface upon stretching. The film had a higher modulus than films previously prepared.

EXAMPLE XI 100 parts of cis-polyisoprene latex of 65 percent dry solids content, obtainable under the name Cariflex I.R. 700 were blended with 33 parts of natural rubber latex of 60 percent dry solids content.

To 100 parts of this blend were added the following ingredients:

| | Parts by weight |
|---|---|
| ASP | 9 |
| Water | 40 |
| ADM | 1.5 |
| ZM | 3.0 |
| AZO | 3.0 |
| ADZ | 1.0 |
| AS | 6.0 |

5.0 parts of the silicone-oil emulsion made in Example VI from the 1000 centistoke viscosity silicone fluid were then stirred into the mix.

A film was prepared by the procedure described in Example X from 10 grammes of the mixture and 0.4 gramme of the aqueous ammoniacal ammonium chloride solution. Curing by steam was carried out for 20 mins. The dried film has a white appearance was micro-porous, and absorbed water applied to its surface when stretched.

EXAMPLE XII

A graft copolymer in the form of a latex, was prepared from methyl methacrylate and natural rubber by stirring 25.6 parts of pure methyl methacrylate monomer containing 0.48 part of oleic acid, into 100 parts of natural rubber latex diluted to 41 percent dry solids content with 46 parts of water and 1.37 parts of aqueous ammonia solution of 0.88 gramme per cc. density. This blend was then irradiated for 16 hours under a cobalt 60 source, at a dose rate of $2.5 \times 10^4$ rads/hour.

100 parts of the resultant latex was compounded with the following ingredients:

| | Parts by weight |
|---|---|
| Aqueous ammonia of 0.88 gm./cc. density | 1.0 |
| ASP | 1.0 |
| AS | 1.25 |
| ZM | 0.5 |
| ADZ | 0.25 |
| ADN | 1.0 |
| AZO | 0.5 |

3.5 parts by weight of the silicone-oil emulsion made in Example VII from the 1000 centistoke viscosity silicone-oil were then stirred into the latex mixture.

A film was prepared by the technique described in Example X from 10 grammes of the latex mixture and 0.3 gramme of aqueous ammioniacal ammonium chloride solution. Curing by steam was carried out for 1 hour.

The dried film was micro-porous since it absorbed water placed on the surface when stretched.

EXAMPLE XIII 0.6 part of a commercially available latex thickening agent obtainable as 15 percent aqueous dispersion of polyacrylic acid under the name Viscalex E.M. 15, was diluted with 40 parts of water and neutralised with aqueous ammonia. This solution was added to 100 parts of natural rubber latex of 60 percent dry solids content, and left to cream for 2 days.

A clear serum layer formed at the bottom of the latex. This was stirred back into the latex and the following compounding ingredients added.

| | Parts by weight (wet) |
|---|---|
| Creamed latex | 100 |
| ADZ | 1.0 |
| AS | 1.8 |
| AZO | 1.8 |
| ZM | 1.0 |

3.5 parts by weight of the silicone-oil emulsion prepared as in Example VII from silicone-oil of 1000 centistokes viscosity were added to the latex mixture. 10 grammes of the latex mixture together with 0.3 gramme of aqueous ammoniacal ammonium chloride solution were spread uniformly over a 6" square glass plate and placed in a levelled position in a steam oven. Steam at 100° C. was applied to gel and cure the film for 10 mins. After this time the film was removed from the plate, rinsed and dried in a 100° C. air oven. The dried film was micro-porous since it absorbed water placed on the surface when stretched.

EXAMPLE XIV 100 parts of the cis-polyisoprene latex described in Example XI were mixed with 40 parts of water and 0.6 gramme of the ammonium polyacrylate creaming agent used in Example XIII. The mixture was left to stand for 2 days, after which time a clear serum was found to have separated at the bottom. This was stirred into the creamed portion and the following compounding ingredients added.

| | Parts by weight (wet) |
|---|---|
| Creamed cis-polyisoprene latex | 100 |
| ASP | 7.0 |
| ADN | 1.0 |
| ZM | 2.0 |
| ADZ | 0.8 |
| AZO | 2.0 |
| AS | 4.5 |

3.5 parts by weight of the silicone-oil emulsion prepared as in Example VII from silicone-oil having a viscosity of 1000 centistokes were then added.

A film was prepared by the technique described in

Example X from 10 grammes of the mixture, and 0.3 gramme of aqueous ammoniacal ammonium chloride solution. The film was cured by steam for 1 hour, then dried in a 100° C. air oven. The dried film was microporous and absorbed water placed on its surface when stretched.

EXAMPLE XV

An emulsion of a phenyl polysiloxane fluid of 30 centistokes viscosity, obtainable under the reference MS .555 was prepared as in Example VII.

Natural rubber latex was compounded as in Example VII and a film prepared as in the same example, from 10 grammes of the mixture and 0.3 gramme of the siliconeoil emulsion. After a 30 min. steam cure, the film was dried at 100° C. This film was micro-porous and absorbed water applied to the surface when stretched.

EXAMPLE XVI 100 parts of the butadiene-styrene copolymer latex used in Example IX, were mixed with 40 parts of water and 0.6 gramme of the ammonium polyacrylate creaming agent used in Example XIII, and the mixture left to stand for 2 days. The latex was then stirred, to homogenise the cream layer with the serum layer.

Compounding ingredients were added according to the following formulation.

| | Parts by weight |
|---|---|
| Creamed butadiene-styrene latex | 100 |
| ZM | 3.0 |
| ADN | 1.0 |
| ADZ | 1.0 |
| AZO | 3.0 |
| AS | 6.0 |

4.5 parts of the silicone-oil emulsion prepared as in Example VII from the silicone-oil having a viscosity of 1000 centistokes were then stirred in.

A film was prepared b ythe technique described in Example X, from 10 grammes of the above mixture and 0.3 gramme of aqueous ammoniacal ammonium chloride solution. The film was cured by steam for 15 mins. then dried in a 100° C. air oven.

The resultant film was of white appearance and was micro-porous and absorbed water applied to its surface when stretched.

Having now described my invention, what I claim is:

1. A method for the production of a microporous flexible material not containing filler which comprises forming a mixture of an emulsion of a silicone-oil, a rubber latex, one or more vulcanizing agents for the rubber, and one or more gelling agents for the latex, gelling the mixture so obtained in hot water or steam, and then vulcanizing the gelled mixture in hot water or steam thereby substantially preventing escape of water from the mixture during the gelling and the vulcanization.

2. A method according to claim 1 in which the mixture is gelled in the form of a film.

3. A method according to claim 2 in which said film after gelling is applied to a consolidated mat of interpenetrated crimped continuous filaments.

4. A method according to claim 3 in which the crimped continuous fibres are man-made fibres.

5. A method according to claim 1 in which the mixture is spread on a woven fabric prior to gelling.

6. A method according to claim 1 in which the mixture is used to impregnate a reticulated foam prior to gelling.

7. A method according to claim 1 in which the silicone-oil has a viscosity of 10 to 1,000,000 centistokes.

8. A method according to claim 7 in which the silicone-oil has a viscosity of from 10 to 12,500 centistokes.

9. A method according to claim 1 in which the silicone-oil is linear methyl polysiloxane.

10. A method according to claim 1 in which the amount of the silicone-oil mixed with the rubber latex is at least 0.6 percent by weight of the dry weight of rubber in the latex.

11. A method according to claim 1 in which the rubber latex is a natural rubber latex.

12. A method according to claim 1 in which the rubber latex is a latex of a graft copolymer of natural rubber and methyl methacrylate.

13. A method according to claim 1 in which the rubber latex is a synthetic rubber latex.

14. A method according to claim 13 in which the synthetic rubber latex is a latex based on a member of the group consisting of a copolymer of styrene and butadiene, polyisoprene, polyisobutylene, polybutadiene, a copolymer of ethylene and propylene, and an interpolymer of ethylene, propylene and a third monomer to confer unsaturation on the interpolymer to enable it to be vulcanized by means of sulphur.

15. A method according to claim 1 in which the rubber latex is a mixture of a natural and synthetic rubber latex.

16. A method according to claim 15 in which the synthetic rubber latex is a latex based on a member of the group consisting of a copolymer of styrene and butadiene, polyisoprene, polyisobutylene, polybutadiene, a copolymer of ethylene and propylene, and an interpolymer of ethylene, propylene and a third monomer to confer unsaturation on the interpolymer to enable it to be vulcanized by means of sulphur.

17. A method according to claim 1 in which vulcanizing agents and one or more vulcanization accelerators are mixed with the latex prior to gelling.

18. A method according to claim 1 which includes the step of impregnating a consolidated mat of crimped continuous fibers with the mixture before the mixture is gelled.

19. A method according to claim 18 in which the consolidated mat is formed from continuous filaments having a denier of from 0.5 to 20.

20. The flexible material prepared by the method of claim 1.

References Cited

UNITED STATES PATENTS

| 2,626,941 | 1/1953 | Habeck | 260—33.6 |
| 2,698,816 | 1/1955 | Dosmann et al. | 117—163 X |
| 3,193,441 | 7/1965 | Schafer | 161—159 |
| 3,245,942 | 4/1966 | Limperos | 117—135.5 |

ROBERT F. BURNETT, Primary Examiner

ROGER L. MAY, Assistant Examiner

U.S. Cl. X.R.

117—135.5, 138.8, 140, 163; 161—170, 159, 88; 260—2.5, 29.7